(12) United States Patent  (10) Patent No.: US 6,561,062 B2
Miller  (45) Date of Patent: May 13, 2003

(54) LATHE

(75) Inventor: David Miller, Jackson, TN (US)

(73) Assignee: Delta International Machinery Corp., Jackson, TN (US)

( * ) Notice: Subject to any disclaimer, the term of this patent is extended or adjusted under 35 U.S.C. 154(b) by 69 days.

(21) Appl. No.: 09/765,194

(22) Filed: Jan. 18, 2001

(65) Prior Publication Data

US 2002/0092388 A1 Jul. 18, 2002

(51) Int. Cl.$^7$ .............................. B23B 3/02; B23B 19/00; A47G 23/02
(52) U.S. Cl. .............................. 82/115; 82/117; 248/151
(58) Field of Search .............................. 142/1; 82/142, 82/149; 409/235; 248/151, 188, 188.7, 188.8, 677

(56) References Cited

U.S. PATENT DOCUMENTS

| 3,535,906 | A | * | 10/1970 | Swick et al. | 148/510 |
|---|---|---|---|---|---|
| 3,650,166 | A | * | 3/1972 | Schmid | 82/149 |
| 3,729,361 | A | * | 4/1973 | Westlake | 156/510 |
| 4,278,413 | A | | 7/1981 | Hilt | |
| 4,349,945 | A | * | 9/1982 | Fox | 144/1.1 |
| 4,381,023 | A | | 4/1983 | Fronczak et al. | |
| 4,622,872 | A | * | 11/1986 | Ito | 82/117 |
| 4,651,404 | A | * | 3/1987 | Shorrock | 29/563 |
| 4,679,295 | A | * | 7/1987 | Lopez | 226/120 |
| 4,691,488 | A | * | 9/1987 | Tomma | 248/559 |
| 4,779,857 | A | | 10/1988 | Maund | |
| 5,025,690 | A | * | 6/1991 | Myers | 82/121 |
| 5,186,088 | A | | 2/1993 | Wixev | |
| D338,475 | S | | 8/1993 | Wilson et al. | |
| 5,499,563 | A | * | 3/1996 | Hansen | 82/112 |
| 5,502,853 | A | * | 4/1996 | Singleton et al. | 5/185 |
| 5,617,768 | A | | 4/1997 | Palazzolo | |
| 5,785,293 | A | | 7/1998 | Ford et al. | |
| 6,079,931 | A | * | 6/2000 | English, Jr. et al. | 414/458 |
| 6,119,287 | A | * | 9/2000 | Phillips | 5/81.1 RP |
| 6,216,335 | B1 | * | 4/2001 | Freyermuth | 29/701 |

OTHER PUBLICATIONS

'Packard Woodworks: Woodturning Tools and Supplies,' 1995, P.O. Box 718, 101 Miller Rd. Tryon, NC, 28782, p. 15.*

* cited by examiner

Primary Examiner—A. L. Wellington
Assistant Examiner—Brian D Walsh
(74) Attorney, Agent, or Firm—Kirkpatrick & Lockhart LLP

(57) ABSTRACT

A lathe having a bed is supported on two legs. In one embodiment, the bed is hollow and has with an inner portion into which a weight enhancing material may be inserted. The bed may include two tubular members separated by spacers. The tubular members may have cross-sections that increase stiffness. In another embodiment, the bed is attached to a support assembly that includes first and second hollow legs, which may also contain weight-enhancing ballast. The first leg may be attached to a first hollow foot and the second leg may be attached to a second hollow foot. A stabilizer bar may be inserted in each foot for increased stability. Pairs of wheel assemblies may be attached to the first and second feet. In yet another embodiment, the lathe includes a headstock having a housing slidable along the bed. The housing encloses a motor that drives a shaft having two spindle ends protruding from the housing.

41 Claims, 10 Drawing Sheets

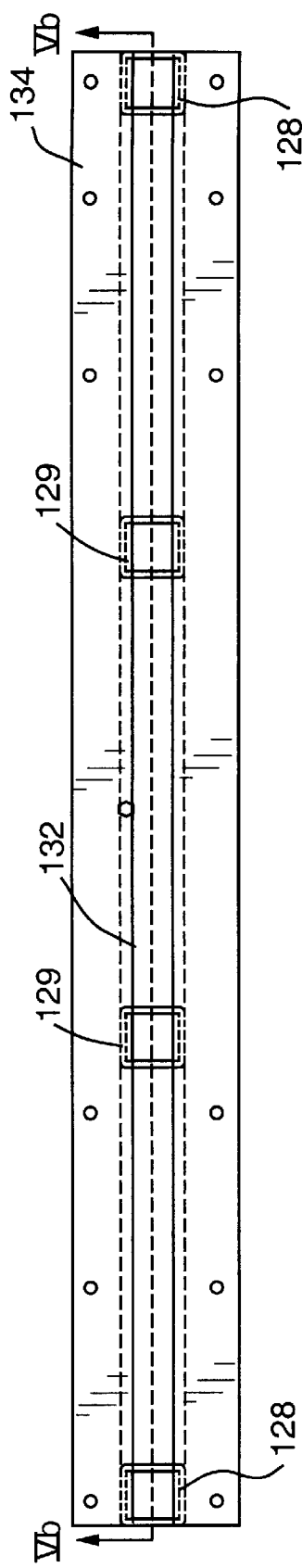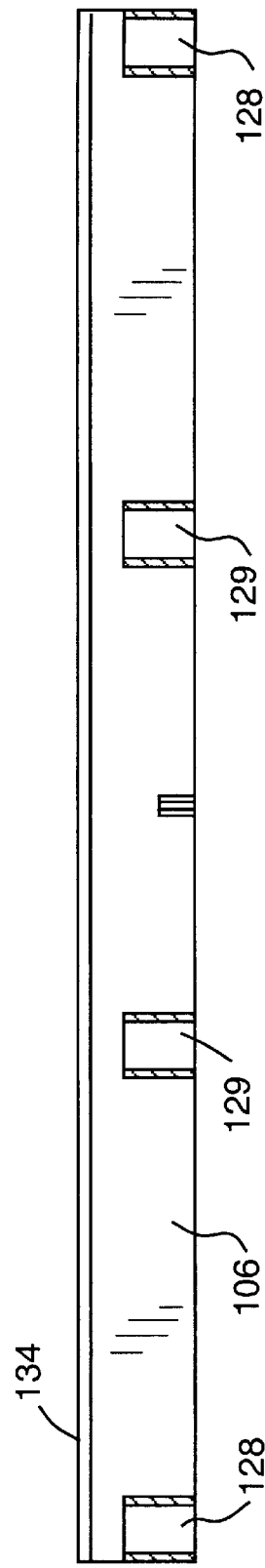
FIG. 5a
FIG. 5b

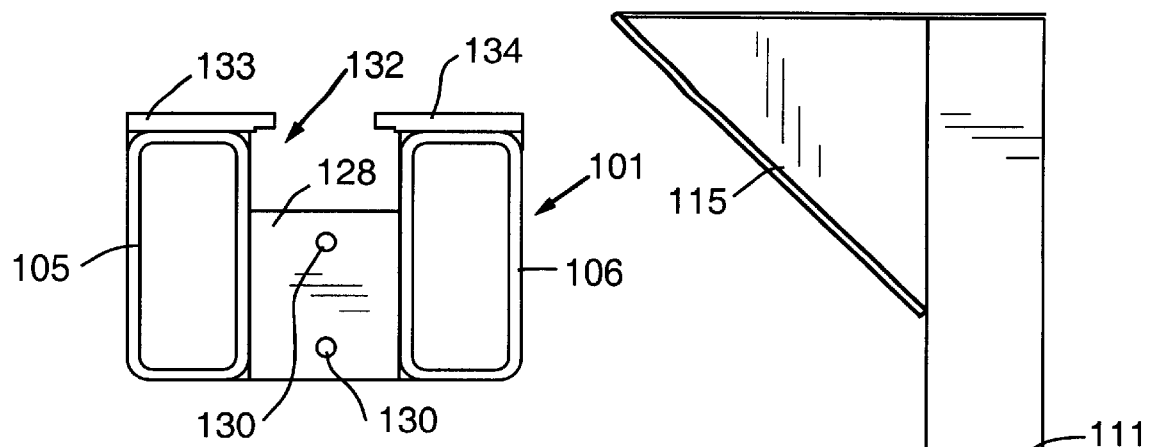
FIG. 6
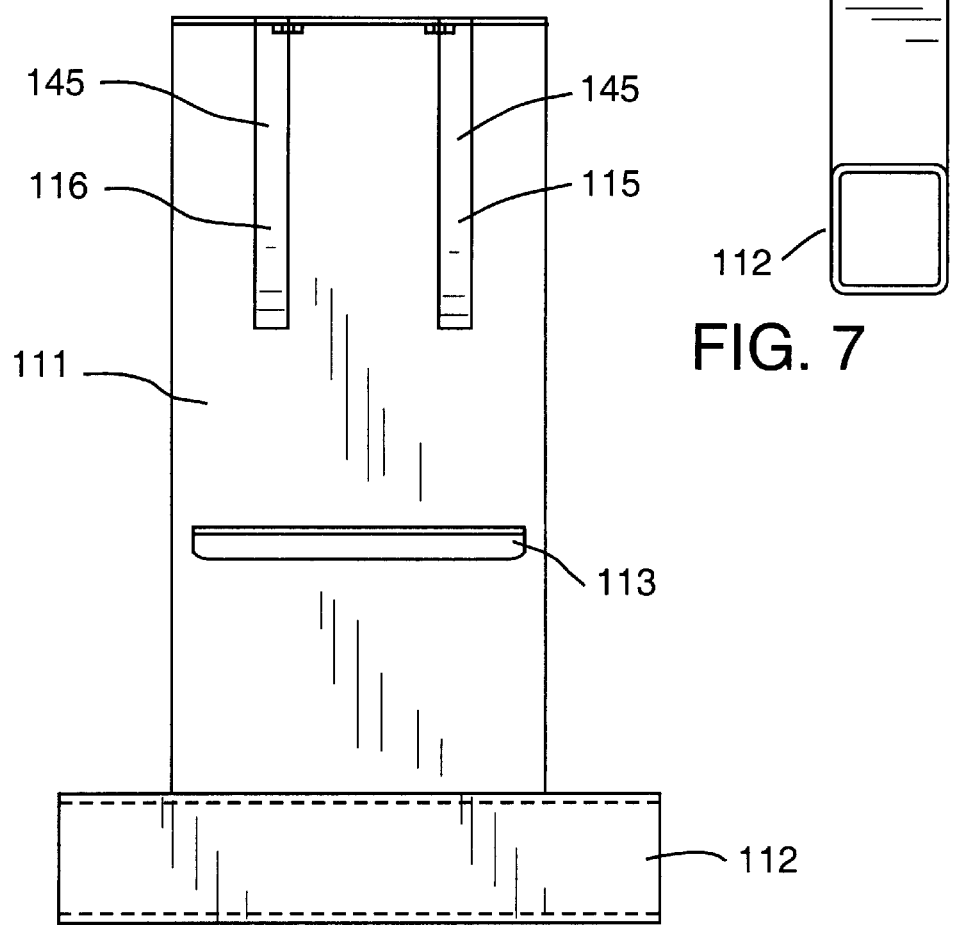
FIG. 7
FIG. 8

LATHE

BACKGROUND OF THE INVENTION

1. Field of the Invention

The invention relates to lathes, and more particularly to a lathe having a hollow bed and a hollow support assembly, each of which may include at least one stiff tubular member in which a stability-enhancing weight may be inserted.

2. Description of the Invention Background

Lathes are machine tools that perform turning operations in which unwanted material is removed from a workpiece rotated against a cutting tool. Such machine tools may be constructed for turning metal workpieces, while other lathes are especially adapted for turning wooden workpieces. Although wood lathes are well-known in the art, most wood lathes have massive, single-piece cast-iron beds supported by light sheet-metal stands. The cast-iron beds are expensive, heavy and sometimes brittle, while the sheet-metal stands typically fail to provide adequate support and stability for such beds, which could lead to excessive vibration and movement of the lathe during operation. Lathes with cast iron beds can be difficult to move around because of their weight and typically occupy a fixed area of valuable workspace.

There remains, therefore, a need for an improved lathe that has a stiff lathe bed, and stand arrangement that is lightweight and versatile, and that is stable and yet easily movable, such that it overcomes the limitations and disadvantages of other lathes.

SUMMARY OF THE INVENTION

The invention meets the identified needs, as well as other needs, as will be more fully understood following a review of this specification and drawings.

One embodiment of the invention discloses a machine tool in the form of a lathe that includes a bed having a hollow interior portion, a first and a second attached to the bed, and a weight ballast received within the hollow interior portion of the bed. The weight ballast in the hollow interior of the bed may include at least one metal bar. The first leg may include a first hollow inner portion having a weight ballast such as sand therein and the second leg may include a second hollow inner portion having additional weight ballast therein. The first leg may be attached to a first foot and the second leg may be attached to a second foot, and each foot may have a hollow inner portion into which a stability-enhancing bar may be inserted. Each foot stability bar may be a wood or metal bar and may be fastened to the respective foot. The bars in the feet may be of length longer than the feet and protrude outside the feet from both ends. A pair of caster wheel assemblies may be also attached to each foot.

A yet another embodiment of the invention discloses a lathe with a headstock having a housing which is slidably supportable on the lathe bed. A drive motor is enclosed in the housing and drives a driven shaft by means of an endless member. The driven shaft has two spindle ends protruding from a front and back surface of the housing, so that two different lathe operations may be performed at each spindle end by attaching different tool holders or chucks on the ends of the driven shaft.

Other features and advantages of the invention will become apparent from the detailed description of the embodiments set forth herein and from the appended claims.

BRIEF DESCRIPTION OF THE DRAWINGS

FIG. 5(a) is a top view of the bed of the embodiment of FIG. 1;

FIG. 5(b) is a sectional view of the bed of FIG. 5(a) taken along section of Vb—Vb of FIG. 5(a);

FIG. 6 is right end view of the bed of the lathe embodiment of FIG. 1;

FIG. 7 is a front view of a first support of the support assembly of the lathe of FIG. 1;

FIG. 8 is a side view of the first support of FIG. 1;

DETAILED DESCRIPTION OF THE INVENTION

In the following description of the invention reference is made to FIGS. 1–10 and in terms of a lathe, for the purpose of illustrating the invention and not for the purpose of limiting the same. It is to be understood that other embodiments incorporating structural changes may be utilized realizing the advantages of the invention, but without departing from the scope of the invention. Although the present invention is described in terms of a lathe, it will be appreciated that the person of ordinary skill in the art will be able to use the invention with other similar machine tools. In addition, while the lathe embodiments disclosed herein are particularly well-suited for turning wooden workpieces, the skilled artisan will readily appreciate that the unique and novel features of these various embodiments could be easily adapted to a variety of different machine tools for fabricating pieces from various other materials such as metal, plastic, etc. Accordingly, the protection afforded to the various embodiments disclosed and claimed herein should not be limited to those work tools specifically adapted for machining articles from wood or wood-like materials.

It is further to be understood that the Figures and descriptions of the present invention have been simplified to illustrate elements that are relevant to a clear understanding of the invention, while eliminating, for clarity, other elements and/or descriptions thereof found in typical lathes. Those of ordinary skill in the art will recognize that other elements may be desirable in order to implement the present invention. A discussion of such elements, which are well-known in the art and do not facilitate a better understanding of the present invention, is not provided herein.

Figure 1:
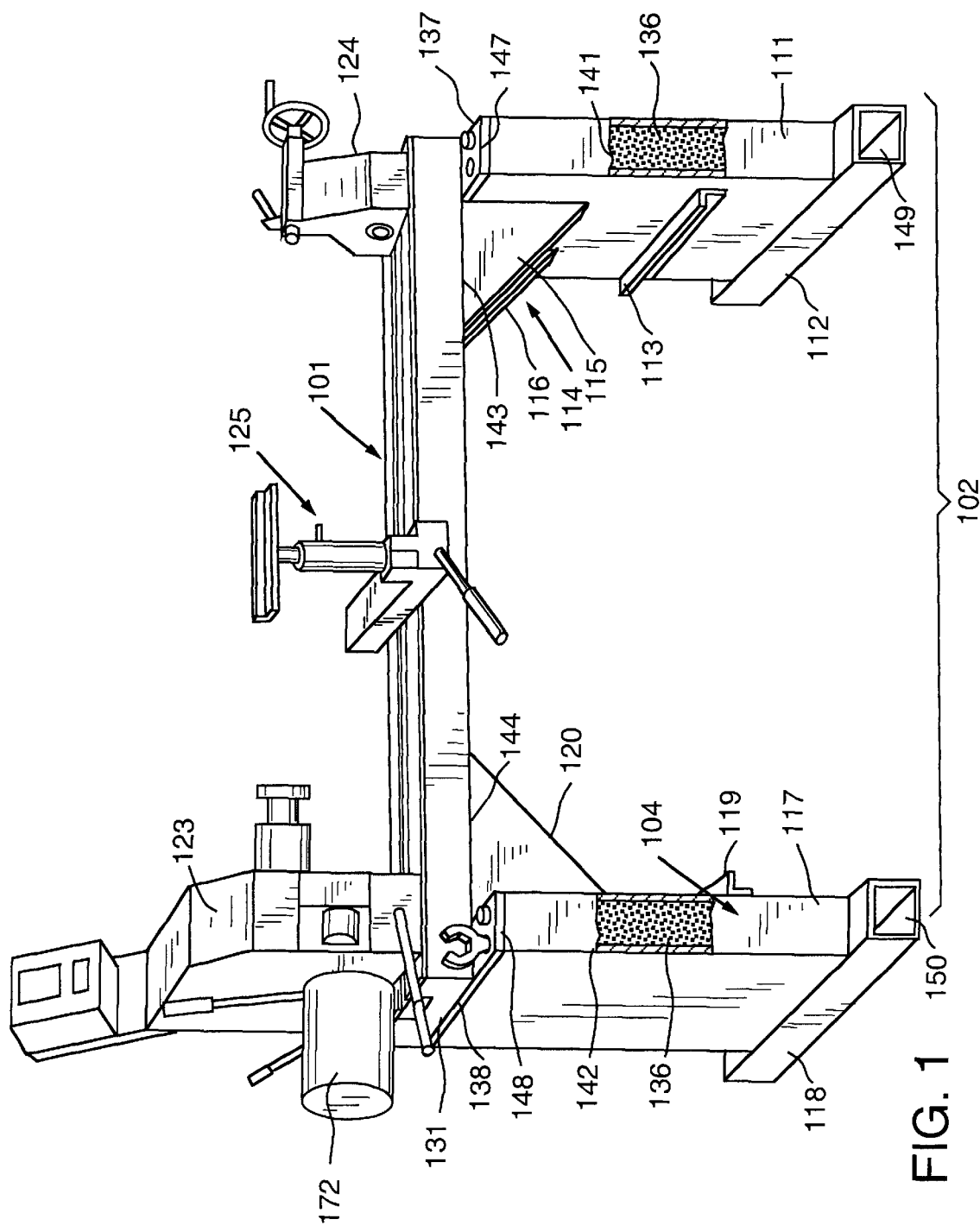
FIG. 1 is an isometric view of an embodiment of a lathe according to the present invention.
Figure 2:
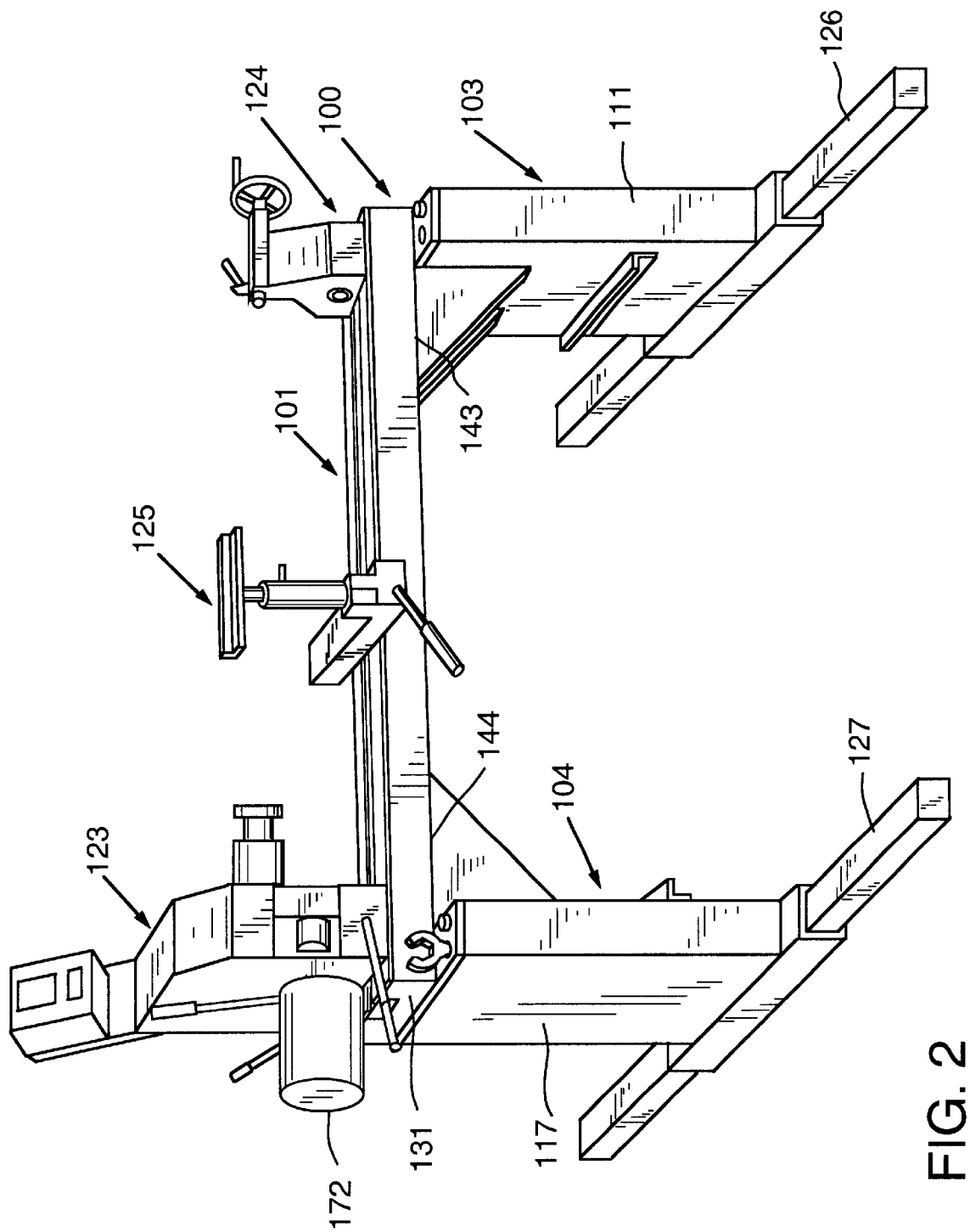
FIG. 2 is an isometric view of the embodiment of FIG. 1 showing bars inserted into the feet of the lathe of FIG. 1.
Figure 3:
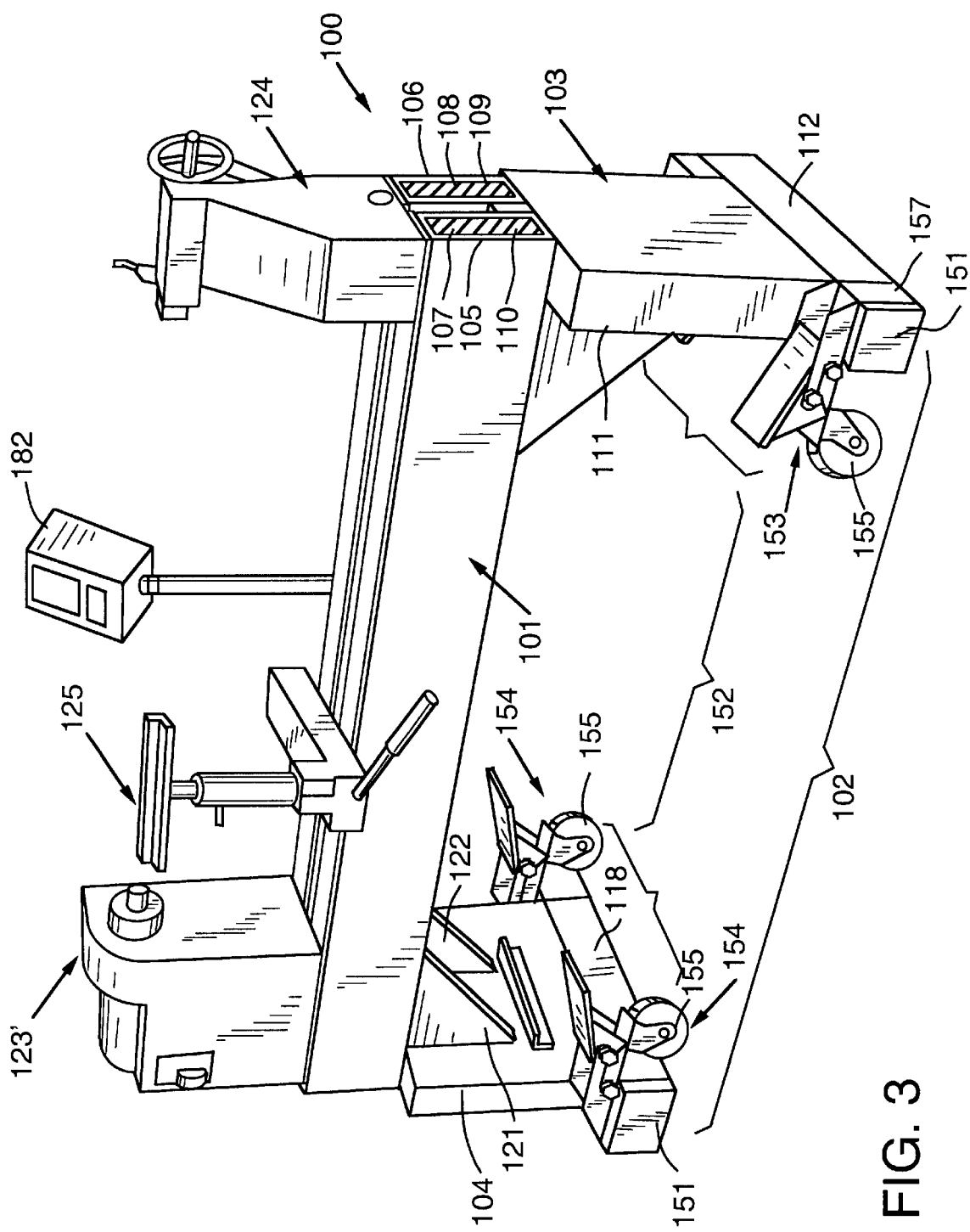
FIG. 3 is an isometric view of another embodiment of the lathe according the present invention also including a mobility kit.

FIGS. 1–3 are isometric views of a lathe 100 incorporating various features of the present invention. The reader will notice, however, that the lathes of FIGS. 1 and 2 employ beds that have shorter height dimensions than the bed 101 of the lathe depicted in FIG. 1. However, unless otherwise indicated, such beds are similarly constructed and thus they will be referred to herein by the same reference numbers. Those of ordinary skill in the art will appreciate that other than the differences noted below the only remaining difference is the size of the components employed to fabricate such beds. The lathe 100 may be, for example, a 16-inch lathe or a 26-inch lathe. The lathe 100 includes a bed 101, and a support assembly 102 that may comprise one or more supports for the bed, such as a first support 103 and a second support 104. In this embodiment, the bed 101 is hollow and may include a first bed member 105 and a second bed member 106. See FIG. 3. The first and second bed members 105 and 106 may comprise tubular members with rectangular cross-sections, such as structural steel tubes with a 2-inch by 4-inch cross-section and 3/16 inch wall thickness conforming to the standards ASTM 500 and ASTM 513, for a 16-inch lathe. For a 26-inch lathe, the bed members 105 and 106 may be, for example, structural steel tubes with a 3-inch by 8-inch cross-section and 1/4 inch wall thickness. It will be appreciated that these cross-sections are simply chosen for convenience and other hollow bed members that are stiff and lightweight may be used. The tubular cross-section is one of the cross-sections that have the characteristic of being stiff in comparison to its weight, and it contributes to reducing the weight of the lathe for increased portability and ease of transporting, for example, before assembling or after disassembling the lathe. It is conceivable that, depending upon the overall length of the bed, the entire bed may be lifted and transported by two persons, by inserting lumber, or other similarly shaped members, such as 2-inch by 4-inch bars into the bed members and lifting the bed at the two ends of the bars. During operation, increased weight is desirable for stability, and may be obtained by inserting a stability-enhancing weight 109 into the hollow interior portion 107 or passage that extends through the first bed member 105 and/or into the hollow inner portion 108 or passage that extends through the second bed member 106. The weight enhancement 109 may conveniently be one or more metal bars 110 stored in the inner portion 107 or 108 of the bed member 105 or 106. The bed 101 of the lathe may support such lathe components as a headstock 123, a tailstock 124 or a tool rest 125.

The embodiment of the bed 101 depicted in FIGS 3, 5(a), 5(b) and 6 includes two tubular bed members 105, 106 that have rectangular cross-sections. The bed members 105, 106 are separated by one or more spacers, such as end spacers 128 and center spacers 129, which form a longitudinal gap or channel 132 between the two bed members 105, 106. The spacers are, for example, stiff and lightweight steel tubes with square cross-sections and are attached to the bed members by, for example, welds or other fasteners. The hollow spacers 128 and 129 and the open channel 132 allow for chips and debris to fall through during the operation of the lathe so that such debris does not accumulate and interfere with the movement of the headstock, tailstock or tool rest base. The end spacers may include tapped holes 130 (shown in FIG. 6) for attaching an end plate 131, shown in FIG. 1. The bed may also include a first top plate 133 attached to the first bed member 105 and a second top plate 134 attached to the second bed member 106.

The first support 103 of the support assembly 102 includes a first leg 111 and a first foot 112. It may also include a first shelf 113 and a first gusset assembly 114 including two gussets 115 and 116. The second support 104 includes a second leg 117 and a second foot 118. It may also include a second shelf 119 and a second gusset assembly 120 including two gusset brackets 121 and 122. The first and second legs 111, 117 are hollow and may contain weight-enhancing and stabilizing ballast material 136, such as sand. The first and second feet 112, 118 are also hollow and may be stabilized with bars 126, 127 inserted into the inner portions 149, 150 of the feet. See FIG. 1. The feet are, for example, steel tubes with 4-inch by 4-inch cross-sections into which "four by four" lumber may be inserted. The lumber may be attached to the feet with bolts at pre-tapped holes 135 shown in FIG. 9, and may also be attached to the floor with suitable fasteners, such as bolts, screws, etc. The lumber may protrude from the feet, as shown in FIG. 2, or may be enclosed within the feet, which are then covered by caps 151. See FIG. 3.

Figure 9:
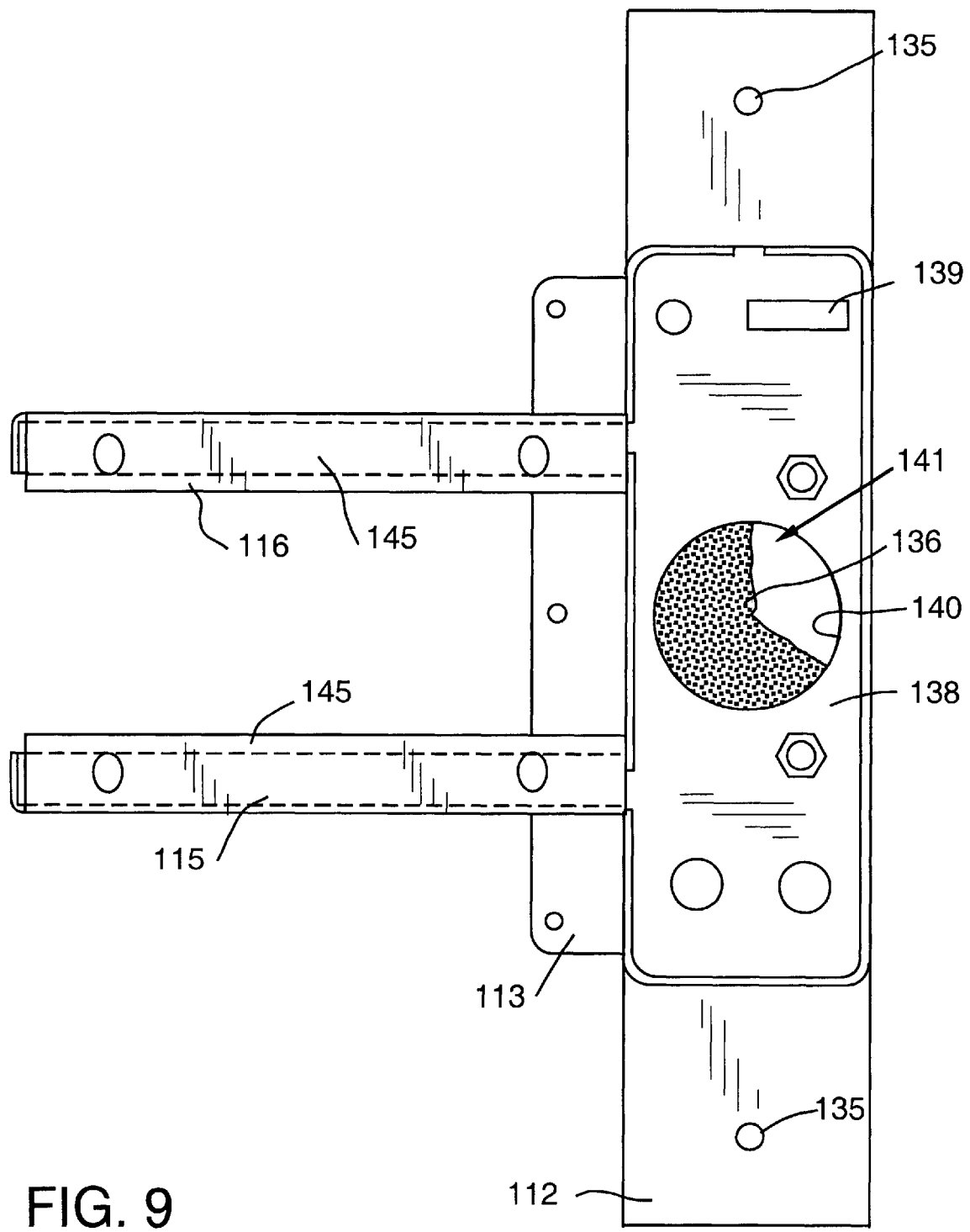
FIG. 9 is a top view of the first support of FIG. 1.

Referring now to FIGS. 1 and 9, the top surfaces 147, 148 of the first leg and second leg 111, 117, may be covered with a first leg top plate 137 and second leg top plate 138 respectively. The top plates 137, 138 may include one or more openings 139 for inserting tools and an opening 140 for inserting ballast 136 into the inner portions 141 and 142 of the first and second legs 111, 117, respectively. See FIG. 1. Each leg may comprise a single steel tube having a rectangular cross-section with dimensions 4-inch by 12-inch, for example, for a 16" lathe, and 4-inch by 8-inch, for example, for a 26-inch lathe. It will be appreciated that each leg may comprise two or more tubes welded or fastened to each other or to intermediate spacers. Each leg may also be a single tube comprising more than one inner portions defined by internal stiffeners. Although the legs are shown to be attached to the bed near the ends of the bed, they could be attached at any distance along the bed, such that the bed is, for example cantilevered outward from the top surfaces of the legs, depending on the particular application.

In this embodiment, the bed 101 may be removably attached to the support assembly 102 with screws or bolts or similar fasteners that engage the first and second top plates 137 and 138 of the legs 111, 117 respectively. A first underside portion 143 of the bed 101 may also be similarly attached to the first gusset brackets 115, 116, and a second underside portion 144 of the bed may be attached to the second gusset brackets 121, 122. The first gusset brackets 115, 116 are also attached to the first leg 111 and the second gusset brackets 121, 122 are attached to the second leg 117. In this embodiment, each of the first and second gusset brackets has, for example, a triangular shape with a first side 145 that attaches to one of the legs 111, 117 and a second side 146 that is attached to the bed 101. The gusset brackets may be welded to the legs for stability and bolted to the bed for ease of disassembly. However, other fastening arrangements could be employed.

As shown in FIG. 3, a mobility kit 152 may be attached to the feet 112, 118 to facilitate moving and relocating the lathe. The mobility kit 152 may include two first caster wheel assemblies 153 mounted to the first foot 112 and two second caster wheel assemblies 154 mounted to the second foot 118. Each of the first and second caster wheel assemblies 153, 154 includes a caster wheel 155. The caster wheel assemblies 153, 154 may be mounted inboard, i.e. with the caster wheels in the space between the two legs 111, 117, as shown in FIG. 3 to minimize floor space use, or outboard with the caster wheels 155 outside to provide more foot room for the operator of the lathe. For stability and ease of maneuvering while moving the lathe, two caster wheel assemblies, either the first pair 153 or the second pair 154, may have wheels that are fixed with respect to the orientation of the feet, and the other pair of caster wheel assemblies may have wheels that are pivotable with respect to the orientation of the feet.

In this embodiment, each of the caster wheel assemblies 153, 154 is attached to one of the feet through a sleeve arrangement. More particularly and with reference to FIG. 10, a caster wheel assembly 153 is affixed to a portion of the foot 112 by sleeve 157 that fits over that foot 112. A caster wheel 155 is attached to a pedal 156 that actuates the wheel 155 independently of the other wheels when the pedal 156 is depressed in the downward position, shifting weight from the foot 158 of the lathe to the wheel 155. With the pedal 156 lifted to the upward position, the weight of the lathe is shifted back entirely to the feet, which can then be fastened to the floor for greater stability during operation.

Figure 4:
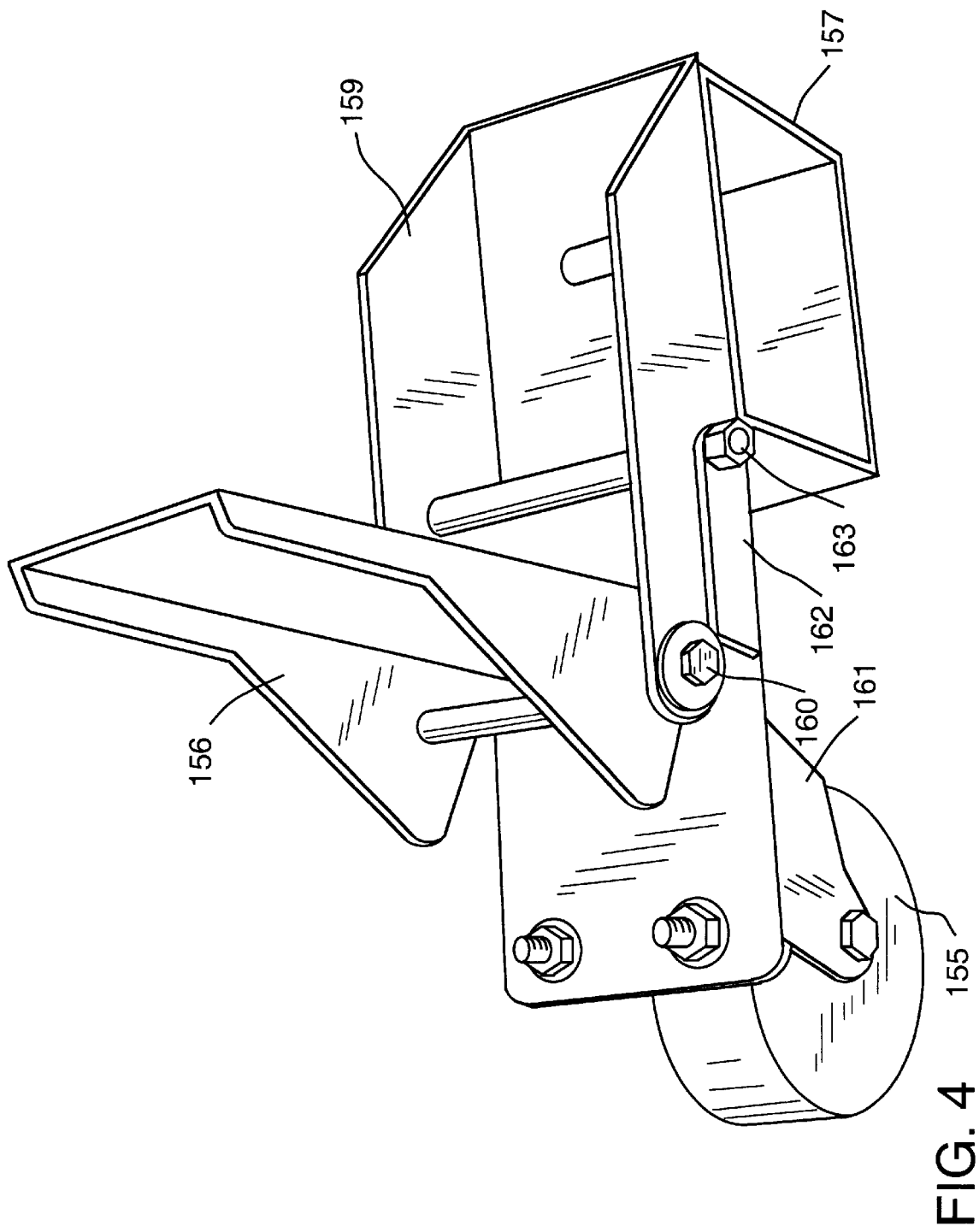
FIG. 4 is an isometric view of a caster wheel assembly of the mobility kit FIG. 3.
Figure 10:
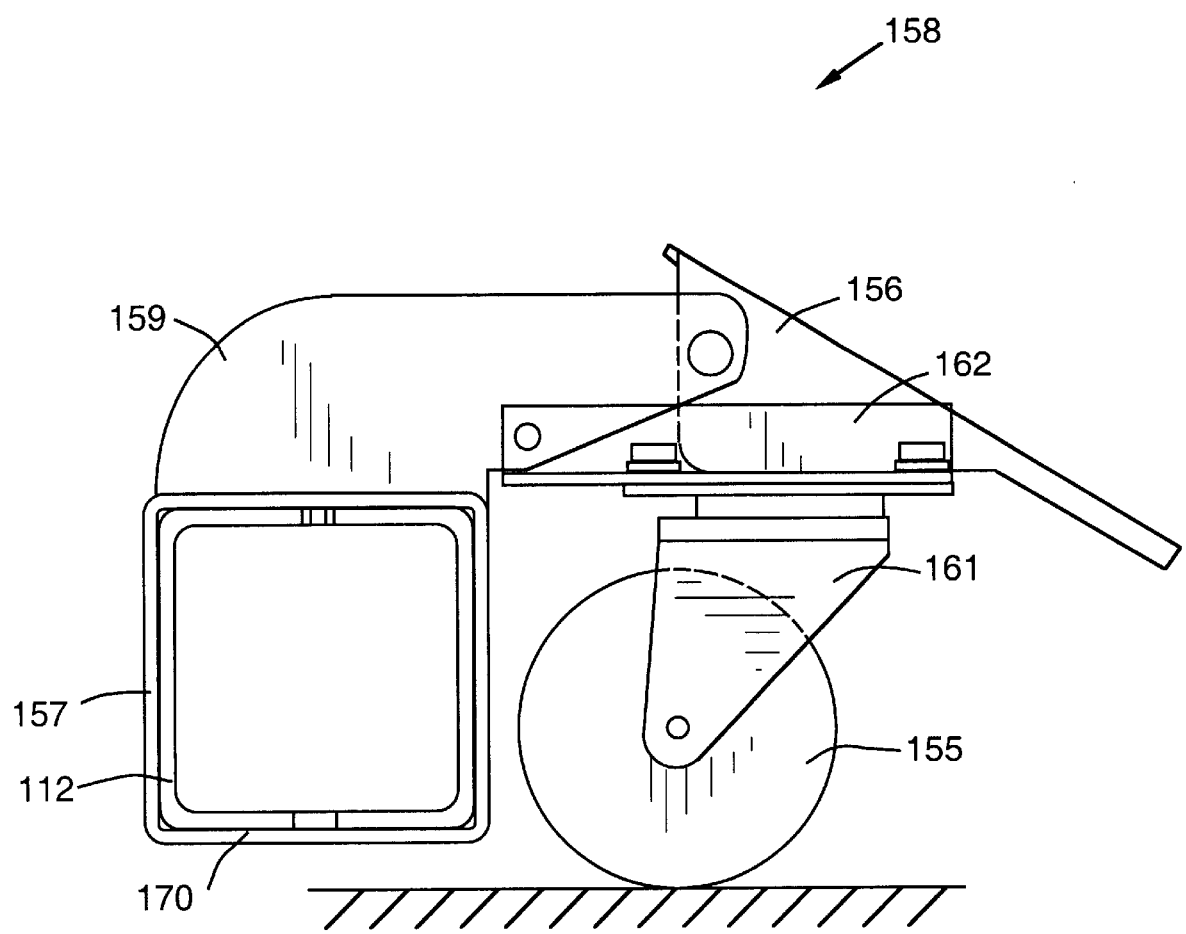
FIG. 10 is a side view of one component of the caster wheel assembly of FIG. 4.

FIGS. 4 and 10 illustrates an embodiment of the attachment of a caster wheel 155 to a sleeve 157, which is fitted over foot 112. A pedal assembly 158 that includes a lever bracket 159 is attached to the sleeve 157 and connected with a pivoting, cam-actuated axle 160 to the pedal 156. The caster wheel is rotatably mounted on caster wheel mount 161, which is attached to a caster wheel plate 162. The lever bracket 159 is attached to the caster wheel plate with a pin 163. When the pedal is depressed, the lever bracket 159 lifts the sleeve 157 with the foot 112 off the ground. Thus, when in such "lowered position" the caster wheel extends below a lower surface 170 of the foot 112. Likewise, when the pedal 156 is not depressed, the caster wheel 155 is above the lower surface 170 in a "raised position" to enable the foot to rest on a support surface. The caster wheel mount 161 may either be fixed in relation to the caster wheel plate 162 or may be rotatable. For easier steering, two wheels mounted on one foot of the support assembly are fixed, while the other two wheels mounted on the other foot are allowed to rotate.

Other caster arrangements that may be employed in connection with the various lathe embodiments of the present invention are disclosed in U.S. Pat. No. 5,785,293, which is incorporated herein by reference.

Figure 11:
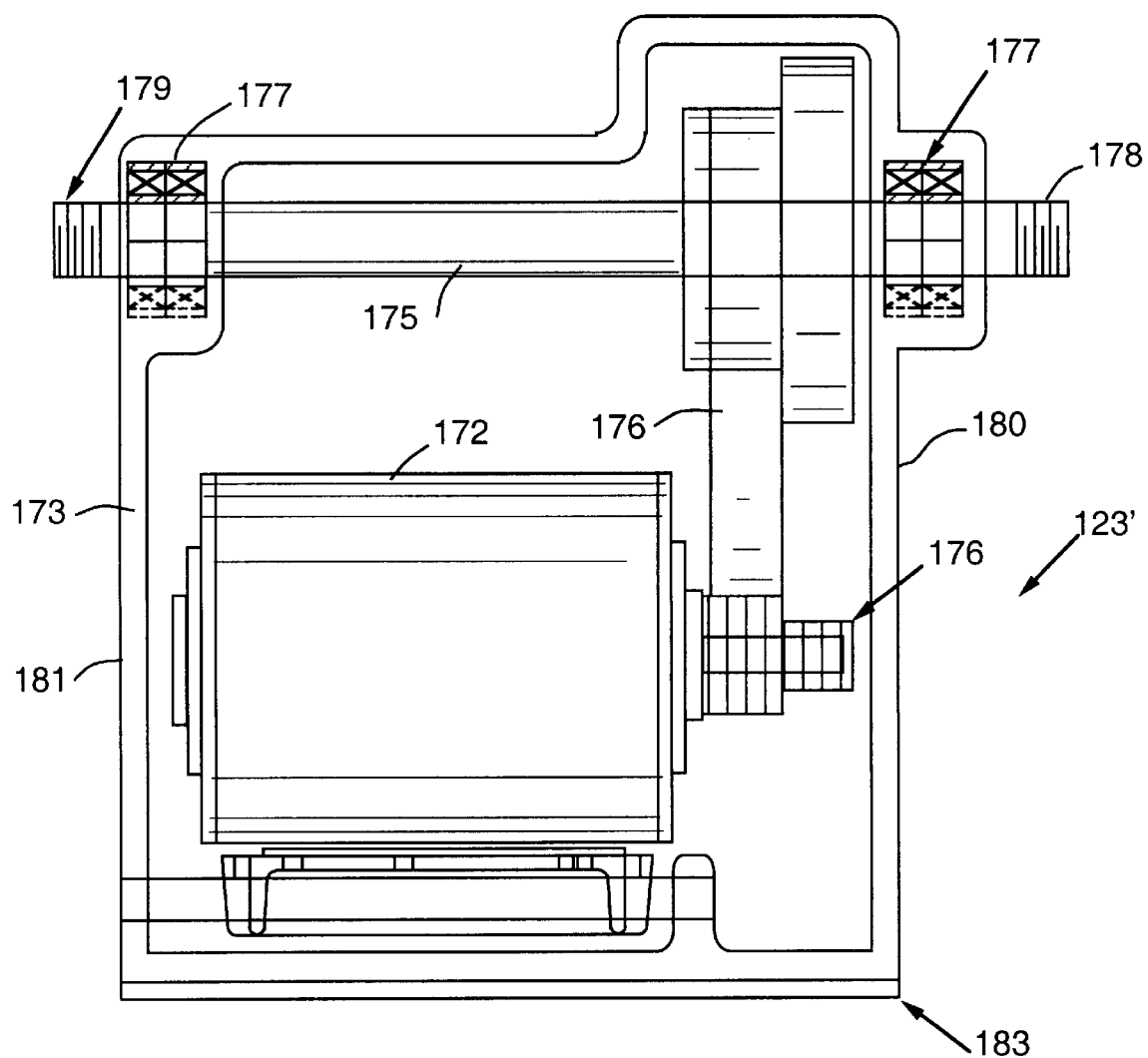
FIG. 11 is front view of an embodiment of a headstock of the lathe of FIG. 3.
Figure 12:
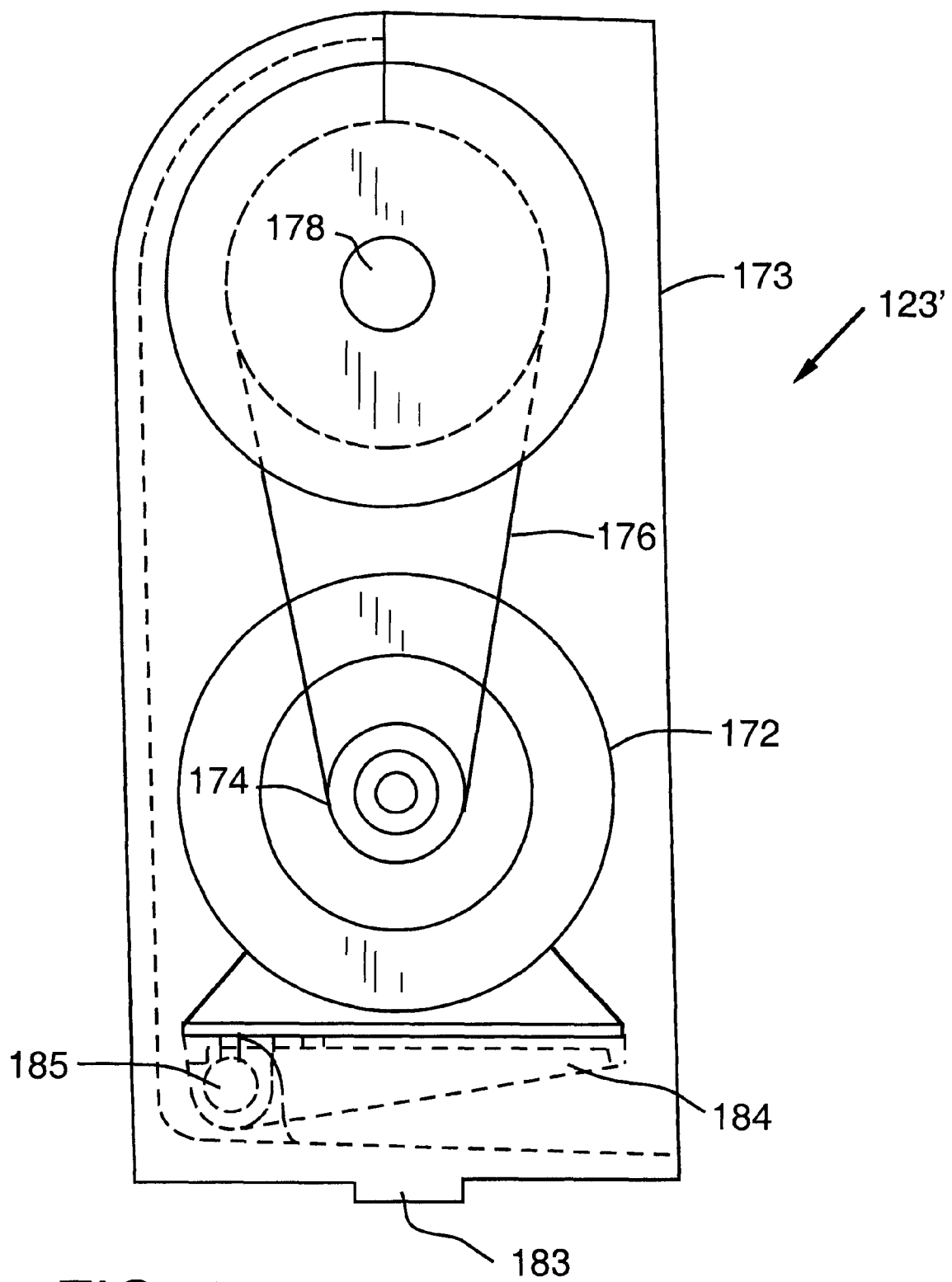
FIG. 12 is a right end view of the headstock of FIG. 11.

In another embodiment, as shown in FIGS. 3, 11 and 12, the headstock 123' may include a drive motor 172 enclosed in a housing 173, which is slidably supported on the lathe bed 101, such that, for example, a tang 183 slides in the bed channel 132 (shown in FIG. 6). The motor 172 includes a drive shaft 174 which is coupled to a driven shaft 175 by an endless member 176, such as a belt of a belt and pulley system or a chain of a chain and sprocket system. The housing 173 may include a pivoting motor base 184 having a pivot 185 for tensioning the belt 176. The driven shaft 175 is rotatably supported on the housing 173 with, for example, bearings 177, and has a front end or front spindle 178 and a back end or back spindle 179. The front end 178 of the driven shaft 175 protrudes from a front surface 180 of the housing 173 and the back end 179 of the driven shaft 175 protrudes from a back surface 181 of the housing 173. The ends or spindles 178, 179 may be threaded for coupling to a tool holder or a chuck that receives a tool for turning a workpiece. The headstock 123' may be moved along the bed 101 and clamped at any location on the bed. This embodiment of the headstock 123' allows the operator to use each spindle 178, 179 of the headstock 123' without requiring additional setup. The tubular construction of the bed 101, in particular, allows a longer bed to be used, such as 72 or 80 inches long, so that the lathe may operate, for example, as a typical length lathe on one side of the headstock 123' and a bowl lathe on the other side of the headstock 123'. Or one of the spindles 178, 179 may be have a chuck for inside bowl turning and the other may have a different chuck for outside bowl turning. The control station 182 is supported on a pivoting bracket and post and may be easily moved to another location in front or back of the bed to provide clearance, as needed. Placing the motor 172 inside the housing 173 enables the operation of the two spindles 178, 179 on the slidable headstock 123' and leads to a versatile, multi-purpose lathe.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A lathe comprising:
   a bed having a hollow interior portion;
   a first leg attached to the bed;
   a first foot attached to the first leg;
   a second leg attached to the bed; and
   a second foot attached to the second leg, wherein the first foot has a hollow first foot inner portion in which a first stability enhancing bar is insertable and wherein the second foot has a hollow second foot inner portion in which a second stability enhancing bar is insertable; each stability enhancing bar being formed of a single unitary structure, wherein each stability enhancing bar is of a greater length than each respective hollow inner foot portion and is inserted into the respective hollow foot inner portion such that portions of each stability enhancing bar extend beyond each end of the inner foot portion.

2. The lathe of claim 1, further comprising a weight ballast received within the hollow interior portion of the bed.

3. The lathe of claim 2, wherein the weight ballast includes at least one metal bar.

4. The lathe of claim 2, wherein the first leg includes a first hollow inner portion having other weight ballast therein and wherein the second leg includes a second hollow inner portion having additional other weight ballast therein.

5. The lathe of claim 4, wherein the other weight ballast comprises sand.

6. The lathe of claim 4, further comprising a first top plate attached to the first leg, the first top plate further having at least one first tool receiving opening therein.

7. The lathe of claim 6, further comprising a second top plate attached to the second leg, the second top plate further having at least one second tool receiving opening therein.

8. The lathe of claim 1, wherein the first foot stability enhancing bar comprises a first wood bar and the second foot stability enhancing bar comprises a second wood bar.

9. The lathe of claim 8, wherein the first wood bar is fastened to the first foot and the second wood bar is fastened to the second foot.

10. The lathe of claim 8, wherein the first foot stability enhancing bar comprises a first metal bar and the second stability enhancing bar comprises a second metal bar.

11. The lathe of claim 1, further comprising a first pair of caster wheel assemblies attached to the first foot and a second pair of caster wheel assemblies attached to the second foot.

12. The lathe of claim 11, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot.

13. A lathe, comprising:
   a bed having a hollow interior portion;
   a first leg attached to the bed;
   a first foot atached to the first leg;
   a second leg attached to the bed;

a second foot attached to the second leg; and a first pair of caster wheel assemblies attached to the first foot and a second pair of caster wheel assemblies attached to the second foot, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot, and wherein each wheel of the first pair of caster wheel assembly is fixedly attached to one of the first caster wheel assemblies, such that each wheel of the first pair of caster wheel assembly can rotate but cannot pivot relative to the first foot and wherein each wheel of the second pair of caster wheel assemblies is pivotably attached to one of the second caster wheel assemblies, such that each wheel each wheel of the second pair of caster wheel assemblies can rotate and pivot relative to the second foot.

14. A lathe, comprising:

a bed having a hollow interior portion;

first leg attached to the bed;

a first foot atached to the first leg;

a second leg attached to the bed;

a second foot attached to the second leg; and a first pair of caster wheel assemblies attached to the first foot and a second pair of caster wheel assemblies attached to the second foot, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot, and wherein each caster wheel of the first pair of caster wheel assemblies is selectively pivotable between a lowered position wherein the first caster wheel can rotate on a surface and a raised position above a lower surface of the first foot, and wherein each caster wheel of the second pair of caster wheel assemblies is selectively pivotable between a lowered position wherein the second caster wheel can rotate on a surface and a raised position above a lower surface of the second foot.

15. The lathe of claim 14, wherein each first caster wheel may be pivoted between the lowered and raised positions by a first foot pedal assembly attached between the first caster wheel and the first foot, and wherein each second caster wheel may be pivoted between the lowered and raised positions by a second foot pedal assembly attached between the second caster wheel and the second foot.

16. A machine tool, comprising:

a tool-supporting bed;

a first hollow leg attached to the tool-supporting bed;

a second hollow leg attached to the tool-supporting bed;

a first foot attached to the first hollow leg; and a second foot attached to the second hollow leg, wherein the first foot has a first hollow first foot inner portion in which a first stability enhancing bar is insertable and wherein the second foot has a hollow second foot inner portion in which a second stability enhancing bar is insertable; wherein each stability enhancing bar being formed of a single unitary structure, wherein each stability enhancing bar is of a greater length than each respective hollow inner foot portion and is inserted into the respective hollow foot inner portion such that portions of each stability enhancing bar extend beyond each end of the inner foot portion.

17. The machine tool of claim 16, further comprising a weight ballast material received in at least one of the first and second hollow legs.

18. The machine tool of claim 17, wherein the weight ballast material comprises sand.

19. The machine tool of claim 16, wherein the first foot stability enhancing bar comprises a first wood bar and the second foot stability enhancing bar comprises a second wood bar.

20. The machine tool of claim 19, wherein the first wood bar is fastened to the first foot and the second wood bar is fastened to the second foot.

21. The machine tool of claim 19, wherein the first foot stability enhancing bar comprises a first metal bar and the second stability enhancing bar comprises a second metal bar.

22. The machine tool of claim 16, further comprising a first pair of caster wheel assemblies attached to the first foot and a second pair of caster wheel assemblies attached to the second foot.

23. The machine tool of claim 22, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot.

24. The machine tool of claim 16, further comprising a first top plate attached to the first leg, the first top plate further having at least one first tool receiving opening therein.

25. The machine tool of claim 24, further comprising a second top plate attached to the second leg, the second top plate further having at least one second tool receiving opening therein.

26. A machine tool, comprising:

a tool-supporting bed;

a first hollow leg attached to the tool-supporting bed;

a second hollow leg attached to the tool-supporting bed;

a first foot attached to the first hollow leg;

a second foot attached to the second hollow leg; and a first pair of caster wheel assemblies attached to the first foot and a second pair of caster wheel assemblies attached to the second foot, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot, and wherein each wheel of the first pair of caster wheel assembly is fixedly attached to one of the first caster wheel assemblies, such that each wheel of the first pair of caster wheel assembly can rotate but cannot pivot relative to the first foot and wherein each wheel of the second pair of caster wheel assemblies is pivotably attached to one of the second caster wheel assemblies, such that each wheel each wheel of the second pair of caster wheel assemblies can rotate and pivot relative to the second foot.

27. A machine tool, comprising:

a tool-supporting bed;

a first hollow leg attached to the tool-supporting bed;

a second hollow leg attached to the tool-supporting bed;

a first foot attached to the first hollow leg;

a second foot attached to the second hollow leg; and a first pair of caster wheel assemblies attached to the first foot and a second pair of caster wheel assemblies attached to the second foot, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot, and wherein each caster wheel of the first pair of caster wheel assemblies is selectively pivotable between a lowered position wherein the first caster wheel can rotate on a surface and a raised position above a lower surface of the first foot, and wherein each caster wheel of the second pair of caster wheel assemblies is selectively pivotable between a lowered position wherein the second caster wheel can rotate on a surface and a raised position above a lower surface of the second foot.

28. The machine tool of claim 27, wherein each first caster wheel may be pivoted between the lowered and raised positions by a first foot pedal assembly attached between the first caster wheel and the first foot, and wherein each second caster wheel may be pivoted between the lowered and raised positions by a second foot pedal assembly attached between the second caster wheel and the second foot.

29. A machine tool, comprising:
   a tool-supporting bed;
   a first leg attached to the tool-supporting bed;
   a second leg attached to the tool-supporting bed; and
   a hollow first foot attached to the first leg and having two open ends;
   a first stabilizer removably received in the hollow first foot and protruding from each of the two open ends thereof;
   a hollow second foot attached to the second leg and having two open ends; and
   a second stabilizer removably received in the hollow second foot and protruding from each of the two open ends thereof.

30. The machine tool of claim 29, further comprising a first pair of caster wheel assemblies attached to the first foot and a second pair of caster wheel assemblies attached to the second foot.

31. The machine tool of claim 30, wherein the first pair of caster wheel assemblies includes a first pair of caster wheels attached to a first pair of sleeves fittable over the first foot and wherein the second pair of caster assembly includes a second pair of caster wheels attached to a second pair of sleeves fittable over the second foot.

32. The machine tool of claim 31, wherein each wheel of the first pair of caster wheel assembly is fixedly attached to one of the first caster wheel assemblies, such that each wheel of the first pair of caster wheel assembly can rotate but cannot pivot relative to the first foot and wherein each wheel of the second pair of caster wheel assemblies is pivotably attached to one of the second caster wheel assemblies, such that each wheel each wheel of the second pair of caster wheel assemblies can rotate and pivot relative to the second foot.

33. The machine tool of claim 31, wherein each caster wheel of the first pair of caster wheel assemblies is selectively pivotable between a lowered position wherein the first caster wheel can rotate on a surface and a raised position above a lower surface of the first foot, and wherein each caster wheel of the second pair of caster wheel assemblies is selectively pivotable between a lowered position wherein the second caster wheel can rotate on a surface and a raised position above a lower surface of the second foot.

34. The machine tool of claim 33, wherein each first caster wheel may be pivoted between the lowered and raised positions by a first foot pedal assembly attached between the first caster wheel and the first foot, and wherein each second caster wheel may be pivoted between the lowered and raised positions by a second foot pedal assembly attached between the second caster wheel and the second foot.

35. A lathe, comprising:
   a bed supporting a headstock, a tailstock and a tool rest, the bed comprising:
      first and second tubular bed members, each bed member adapted to receive an optional weight enhancing bar;
      at least one spacer attached to and between the first and second tubular bed members; and
      a first plate attached to a top surface of the first bed member and a second plate attached to a top surface of the second bed member, the second plate being coplanar with the first plate; and
   a support assembly removably attached to the bed, the support assembly comprising:
      first and second tubular legs, each leg adapted to receive a weight enhancing ballast material;
      a first tubular foot attached to the first leg and adapted to receive a first weight enhancing bar and a second tubular foot attached to the second leg and adapted to receive a second weight enhancing bar; and
      first and second pairs of gussets, wherein each gusset of each of the first and second pair has a first side attached to one leg and a second side attached to and supporting the bed.

36. The lathe of claim 35, further comprising a first pair of caster wheel assemblies attached to the first foot and a second pair of caster wheel assemblies attached to the second foot.

37. A lathe, comprising a bed attached to a support assembly, the support assembly including first and second legs, the first leg attached to a first foot and the second leg attached to a second foot, wherein each of the first and second feet are constructed from tubular members, in each of which a stability enhancing bar is inserted, wherein each stability enhancing bar is formed of a single unitary structure, and wherein each stability enhancing bar is of a greater length than each respective tubular foot and is inserted into the respective tubular foot such that portions of each stability enhancing bar extend beyond each end of the tubular foot.

38. A support assembly for a lathe having a bed, the support assembly removably attached to the bed, the support assembly comprising:
   first tubular leg having a first top surface and a second tubular leg having a second a top surface, each leg adapted to receive a weight enhancing ballast material;
   a first tubular foot attached to the first leg and receiving a first weight enhancing bar and a second tubular foot attached to the second leg and receiving a second weight enhancing bar;
   first and second pairs of gussets, wherein each gusset of each of the first and second pair has a first side attached to one leg and a second side attachable to the bed; and first and second top plates removably attachable to the first and second top surfaces of the first and second legs.

39. A method of supporting the bed of a lathe, the method comprising:
   attaching the bed to at least one hollow leg;
   attaching at least one hollow foot to at least one hollow leg; and
   inserting a stabilizing bar into the hollow foot.

40. The method of claim 39, further comprising:

placing a weight ballast into at least one hollow leg.

41. The method of claim 40, wherein the bed has a hollow interior and wherein the method comprises inserting a weight-enhancing bar into the hollow interior of the bed.

* * * * *

UNITED STATES PATENT AND TRADEMARK OFFICE
CERTIFICATE OF CORRECTION

PATENT NO.   : 6,561,062 B2
DATED        : May 13, 2003
INVENTOR(S)  : Miller

It is certified that error appears in the above-identified patent and that said Letters Patent is hereby corrected as shown below:

Title page,
Item [57], ABSTRACT,
Line 2, delete "with".

Column 2,
Line 4, after "according" insert -- to --.
Lines 12 and 20, after "is" insert -- a --.

Column 4,
Line 27, after "example" insert -- , --.

Column 5,
Line 9, delete "illustrates" and substitute therefor -- illustrate --.
Line 59, delete "be".

Column 7,
Line 17, delete "each wheel" second occurrence.

Column 8,
Line 58, delete "each wheel" second occurrence.

Column 9,
Line 58, delete "each wheel" second occurrence.

Column 10,
Line 58, delete "a".

Signed and Sealed this

Thirteenth Day of July, 2004

JON W. DUDAS
*Acting Director of the United States Patent and Trademark Office*